(12) United States Patent
Maeda et al.

(10) Patent No.: US 7,589,142 B2
(45) Date of Patent: Sep. 15, 2009

(54) THERMOPLASTIC RESIN COMPOSITION AND MOLDINGS THEREOF

(75) Inventors: Kazuhiko Maeda, Ube (JP); Toshio Takemoto, Ube (JP); Masakazu Fujii, Ube (JP); Yasuharu Fukui, Ube (JP); Yoshihiro Urata, Ube (JP)

(73) Assignees: UMG ABS, Ltd (JP); Ube Industries, Ltd. (JP)

( * ) Notice: Subject to any disclaimer, the term of this patent is extended or adjusted under 35 U.S.C. 154(b) by 307 days.

(21) Appl. No.: 10/527,604

(22) PCT Filed: Sep. 17, 2003

(86) PCT No.: PCT/JP03/11855

§ 371 (c)(1),
(2), (4) Date: Mar. 15, 2005

(87) PCT Pub. No.: WO2004/026960

PCT Pub. Date: Apr. 1, 2004

(65) Prior Publication Data

US 2006/0004141 A1    Jan. 5, 2006

(30) Foreign Application Priority Data

Sep. 17, 2002 (JP) .............................. 2002-269713
Oct. 11, 2002 (JP) .............................. 2002-298310

(51) Int. Cl.
*C08L 77/00* (2006.01)
*C08L 35/06* (2006.01)
*C08L 39/04* (2006.01)

(52) U.S. Cl. ................. 524/444; 524/445; 524/447; 524/449; 524/451; 524/456; 524/504; 525/66; 525/179; 525/183

(58) Field of Classification Search ............. 525/66, 525/179, 183; 524/445, 447, 449, 451, 456, 524/444, 504

See application file for complete search history.

(56) References Cited

U.S. PATENT DOCUMENTS

| | | | | |
|---|---|---|---|---|
| 4,824,905 A | * | 4/1989 | Saeki et al. | 525/66 |
| 5,798,403 A | | 8/1998 | Yamashita et al. | |
| 6,274,243 B1 | * | 8/2001 | Nakajima et al. | 428/423.5 |

FOREIGN PATENT DOCUMENTS

| | | |
|---|---|---|
| EP | 0 220 155 A1 | 4/1987 |
| EP | 0 278 500 A2 | 8/1988 |
| EP | 1 022 117 A1 | 7/2000 |
| JP | 4-120167 A | 4/1992 |
| JP | 9-217006 A | 8/1997 |
| JP | 10-158508 A | 6/1998 |
| JP | 11-80497 A | 3/1999 |
| JP | 11 286587 A | 10/1999 |
| JP | 2000-17170 A | 1/2000 |

* cited by examiner

*Primary Examiner*—Ana L Woodward
(74) *Attorney, Agent, or Firm*—DLA Piper LLP (US)

(57) ABSTRACT

A polyamide resin/rubber-reinforced styrene-based resin composition, particularly, a polyamide resin/ABS resin composition, excellent in the balance between impact strength and fluidity as well as in the heat resistance, chemical resistance and paintability, as well as a shaped article thereof, are provided. The resin composition comprises 100 parts by weight of a thermoplastic resin comprising (A) from 79.5 to 20 parts by weight of a polyamide resin, (B) from 20 to 79.5 parts by weight of a polymer obtained by grafting an aromatic vinyl-based monomer and a vinyl cyanide-based monomer to a specific rubber-like polymer, (C) from 0.5 to 60 parts by weight of an unsaturated carboxylic acid-modified copolymer obtained by copolymerizing an unsaturated carboxylic acid, an aromatic vinyl-based monomer and a vinyl cyanide-based monomer, and (D) from 0 to 50 parts by weight of a copolymer obtained by copolymerizing an aromatic vinyl-based monomer and a vinyl cyanide-based monomer (with the proviso that the total of (A), (B), (C) and (D) is 100 parts by weight), and if desired, further comprises (E) from 0.05 to 150 parts by weight of an inorganic filler.

20 Claims, No Drawings

THERMOPLASTIC RESIN COMPOSITION AND MOLDINGS THEREOF

TECHNICAL FIELD

This disclosure relates to a thermoplastic resin composition excellent in the balance between impact strength, particularly, impact strength at low temperatures, and fluidity as well as in the heat resistance, chemical resistance and paintability, and also relates to a shaped article thereof.

BACKGROUND

Polyamide resin is excellent in the chemical resistance, mechanical strength, heat resistance, abrasion resistance and the like and is widely used for electric-electronic parts, machine parts and automobile parts. However, this resin is disadvantageously poor in the impact strength. On the other hand, a rubber-reinforced styrene-based resin such as HIPS (high-impact styrene copolymer resin), ABS resin (acrylonitrile-butadiene-styrene copolymer resin), AES resin (acrylonitrile-ethylene-propylene-based rubber-styrene copolymer resin) and AAS resin (acrylonitrile-acryl-based rubber-styrene copolymer resin) is excellent in impact strength and shapability and is also widely used for automobile parts, office appliance parts, electric parts and the like, but this resin is disadvantageously inferior in chemical resistance and abrasion resistance.

In order to mutually redeem these disadvantages of respective resins, a blend of polyamide resin and ABS resin has been proposed (see, for example, Japanese Examined Patent Publication (Kokoku) No. 38-23476). However, compatibility between polyamide resin and ABS resin is low and therefore, a technique of copolymerizing an unsaturated carboxylic acid with styrene or acrylonitrile and blending the obtained unsaturated carboxylic acid-modified copolymer as a compatibilizer to the polyamide resin and ABS resin has been proposed (see, for example, Japanese Examined Patent Publication (Kokoku) No. 7-84549). With such an improvement in the compatibility, the impact strength is also enhanced to a certain extent.

However, with recent progress in increasing the size and reducing the thickness of home appliance parts, automobile parts and the like, a polyamide resin/rubber-reinforced styrene-based resin composition, particularly, a polyamide resin/ABS resin composition, excellent in the fluidity as well as in the impact strength is demanded to enhance the shaping cycle and increase the productivity.

To meet this requirement, a technique of using an unsaturated carboxylic acid-modified copolymer having a reduced viscosity within a limited range as a compatibilizer and thereby balancing the impact strength and the fluidity has been proposed, but its effect is not yet satisfactory (see, Japanese Unexamined Patent Publication (Kokai) No. 2000-17170).

It could therefore be advantageous to solve those problems in the polyamide resin/rubber-reinforced styrene-based resin composition, and to provide a polyamide resin/rubber-reinforced styrene-based resin composition, particularly, a polyamide resin/ABS resin composition, excellent in balance between impact strength and fluidity as well as in heat resistance, chemical resistance and paintability.

SUMMARY

We thus provide:

[1] A thermoplastic resin composition comprising the following components:
(A) from 20 to 79.5 parts by weight of a polyamide resin;
(B) from 20 to 79.5 parts by weight of a graft polymer, the graft polymer being obtained by,
  (a) in the presence of from 40 to 80 wt % of a rubber-like polymer having a swell index of 10 to 80 and a weight average particle diameter of 100 to 600 nm,
  (b) graft-polymerizing from 20 to 60 wt % of a monomer mixture comprising:
    (i) from 50 to 90 wt % of an aromatic vinyl-based monomer,
    (ii) from 10 to 50 wt % of a vinyl cyanide-based monomer, and
    (iii) from 0 to 30 wt % of another vinyl monomer copolymerizable with those monomers,
  in which the acetone-soluble moiety of the graft polymer (B) has a number average molecular weight of 20,000 to 200,000;
(C) from 0.5 to 60 parts by weight of an unsaturated carboxylic acid-modified polymer, the unsaturated carboxylic acid-modified polymer being obtained by copolymerizing from 0.05 to 20 wt % of an unsaturated carboxylic acid monomer, from 50 to 89.95 wt % of an aromatic vinyl-based monomer and from 10 to 49.95 wt % of a vinyl cyanide-based monomer, and having a number average molecular weight of 22,000 to 60,000; and
(D) from 0 to 50 parts by weight of a copolymer, the copolymer being obtained by copolymerizing from 50 to 90 wt % of an aromatic vinyl monomer, from 10 to 50 wt % of a vinyl cyanide-based monomer and from 0 to 60 wt % of another vinyl-based monomer copolymerizable with those monomers;

with the proviso that the total amount of the components (A) to (D) is 100 parts by weight.

[2] A thermoplastic resin composition comprising the following components:
(A) from 20 to 79.5 parts by weight of a polyamide resin;
(B) from 20 to 79.5 parts by weight of a graft polymer, the graft polymer being obtained by,
  (a) in the presence of from 40 to 80 wt % of a rubber-like polymer having a swell index of 10 to 80 and a weight average particle diameter of 100 to 600 nm,
  (b) graft-polymerizing from 20 to 60 wt % of a monomer mixture comprising:
    (i) from 50 to 90 wt % of an aromatic vinyl-based monomer,
    (ii) from 10 to 50 wt % of a vinyl cyanide-based monomer, and
    (iii) from 0 to 30 wt % of another vinyl monomer copolymerizable with those monomers,
  in which the acetone-soluble moiety has a number average molecular weight of 20,000 to 200,000;
(C) from 0.5 to 60 parts by weight of an unsaturated carboxylic acid-modified polymer,
  the unsaturated carboxylic acid-modified polymer being obtained by copolymerizing from 0.05 to 20 wt % of an unsaturated carboxylic acid monomer, from 50 to 89.95 wt % of an aromatic vinyl-based monomer and from 10 to 49.95 wt % of a vinyl cyanide-based monomer, and having a number average molecular weight of 22,000 to 60,000; and
(D) from 0 to 50 parts by weight of a copolymer,
  the copolymer being obtained by copolymerizing from 50 to 90 wt % of an aromatic vinyl monomer, from 10 to 50 wt % of a vinyl cyanide-based monomer and from 0 to 60 wt % of another vinyl-based monomer copolymerizable with those monomers;

with the proviso that the total amount of the components (A) to (D) is 100 parts by weight; and (E) from 0.05 to 150 parts by weight of an inorganic filler.

[3] The thermoplastic resin composition as described in [2], wherein the number average molecular weight of the polyamide resin is from 10,000 to 20,000.

[4] The thermoplastic resin composition as described in anyone of [1] to [3], wherein the graft polymer is obtained by graft-polymerizing styrene and acrylonitrile in the presence of a rubber-like polymer.

[5] The thermoplastic resin composition as described in [1] to [4], wherein the amount of the unsaturated carboxylic acid monomer in the unsaturated carboxylic acid-modified copolymer is from 0.5 to 10 wt %.

[6] The thermoplastic resin composition as described in [1] to [4], wherein the amount of the unsaturated carboxylic acid monomer in the unsaturated carboxylic acid-modified copolymer is from 0.8 to 7 wt %.

[7] The thermoplastic resin composition as described in [1] to [6], wherein the unsaturated carboxylic acid in the unsaturated carboxylic acid-modified copolymer is methacrylic acid.

[8] The thermoplastic resin composition as described in [1] to [7], wherein the unsaturated carboxylic acid-modified copolymer is obtained by copolymerizing methacrylic acid, styrene and acrylonitrile.

[9] The thermoplastic resin composition as described in [1] to [8], which comprises the rubber-like polymer in the range from 8 to 40 wt %.

[10] The thermoplastic resin composition as described in [1] to [8], which comprises the rubber-like polymer in the range from 10 to 25 wt %.

[11] The thermoplastic resin composition as described in [2] to [10], wherein the inorganic filler is a layered silicate with one unit having a one-side length of 0.002 to 1 μm and a thickness of 6 to 20 Å.

[12] A shaped article comprising the thermoplastic resin composition described in [1] to [11].

[13] An automobile part obtained by shaping the thermoplastic resin composition described in [1] to [11].

DETAILED DESCRIPTION

Examples of the polyamide resin (A) include nylon 6, nylon 46, nylon 66, nylon 69, nylon 610, nylon 612, nylon 116, nylon 4, nylon 7, nylon 8, nylon 11, nylon 12, nylon 6I, nylon 6/66, nylon 6T/6I, nylon 6/6T, nylon 66/6T, polytrimethylhexamethylene terephthalamide, polybis(4-aminocyclohexyl)methane dodecamide, polybis(3-methyl-4-aminocyclohexyl)methane dodecamide, polymetaxylylene adipamide, nylon 11 T, polyundecamethylene hexahydroterephthalamide and polyamide elastomer. In these examples, I represents an isophthalic acid component and T represents a terephthalic acid component. Among these, nylon 6, nylon 46, nylon 66, nylon 12, nylon 6T/6I, nylon 6/6T and nylon 66/6T are preferred.

In the case where an inorganic filler is contained, the polyamide resin (A) has a number average molecular weight of 10,000 to 20,000. If the number average molecular weight is less than 10,000, the impact strength disadvantageously decreases, whereas if the number average molecular weight exceeds 20,000, the fluidity disadvantageously decreases.

In the thermoplastic resin composition, the polyamide resin (A) is used in an amount of 20 to 79.5 parts by weight, preferably from 20 to 70 parts by weight, with the proviso that the total amount of the components (A) to (D) is 100 parts by weight. If the amount of the polyamide resin is less than 20 parts by weight, poor chemical resistance results, whereas if it exceeds 79.5 parts by weight, the impact strength decreases.

The graft polymer (B) is a polymer obtained by graft-polymerizing from 60 to 20 wt % of a monomer mixture comprising from 90 to 50 wt % of an aromatic vinyl-based monomer, from 10 to 50 wt % of a vinyl cyanide-based monomer and from 0 to 30 wt % of another vinyl monomer copolymerizable with those monomers in the presence of from 40 to 80 wt % of a rubber-like polymer having a swell index of 10 to 80 and a weight average particle diameter of 100 to 600 nm, in which the acetone-soluble moiety of the graft polymer (B) has a number average molecular weight of 20,000 to 200,000.

Examples of the rubber-like polymer for use in the graft copolymer (B) include conjugated diene rubbers, conjugated diene-based polymers such as a copolymer of a conjugated diene and a vinyl-based monomer copolymerizable therewith, acryl ester-based polymers such as an acrylic acid ester polymer and a copolymer of an acrylic acid ester and a vinyl-based monomer copolymerizable therewith, ethylene-propylene-non-conjugated diene copolymers or butene-propylene-non-conjugated diene copolymers, and polyorganosiloxane-based polymers.

Examples of the vinyl-based monomer copolymerizable with a conjugated diene-based monomer or an acrylic acid ester include aromatic vinyl-based monomers such as styrene and α-methylstyrene, vinyl cyanide-based monomers such as acrylonitrile and methacrylonitrile, and unsaturated carboxylic acid alkyl ester-based monomers such as methyl acrylate, ethyl acrylate and methyl methacrylate.

Accordingly, specific examples of the rubber-like polymer include polybutadiene, polyisoprene, a butadiene-styrene copolymer, a butadiene-acrylonitrile copolymer and a butadiene-methyl methacrylate copolymer, with polybutadiene and a butadiene-styrene copolymer being preferred.

Examples of the acrylic acid ester in the acrylic acid ester polymer include methyl acrylate, ethyl acrylate, propyl acrylate, butyl acrylate, isobutyl acrylate, pentyl acrylate, isoamyl acrylate, n-hexyl acrylate, 2-methylpentyl acrylate, 2-ethylhexyl acrylate and n-octyl acrylate. Among these, butyl acrylate and isobutyl acrylate are preferred.

Examples of the diene contained in the ethylene-propylene-non-conjugated diene copolymer include dicyclopentadiene, 1,4-hexadiene, 1,4-heptadiene, 1,5-cyclooctadiene, 6-methyl-1,5-heptadiene, 11-ethyl-1,11-tridecadiene and 5-methylene-2-norbornene.

Out of these rubber-like polymers, one polymer may be used alone, or two or more polymers may be used as a composite rubber.

The graft polymer (B) can be obtained by graft-polymerizing an aromatic vinyl-based monomer, a vinyl cyanide-based monomer and if desired, another vinyl monomer copolymerizable with these monomers to the above-described rubber-like polymer. Examples of the aromatic vinyl-based monomer include styrene, α-methylstyrene, p-methylstyrene, chlorostyrene and bromostyrene. These monomers are used individually or as a mixture of two or more thereof. Among these, styrene and α-methylstyrene are preferred. Examples of the vinyl cyanide-based monomer include acrylonitrile and methacrylonitrile. These monomers are also used individually or as a mixture of two or more thereof. In particular, acrylonitrile is preferred.

Examples of the another vinyl monomer copolymerizable with these aromatic vinyl-based monomer and vinyl cyanide-based monomer include maleimide-based monomers such as maleimide, methylmaleimide, ethylmaleimide, N-phenylmaleimide and O-chloro-N-phenylmaleimide, and unsaturated carboxylic acid ester-based monomers such as methyl acrylate, ethyl acrylate, methyl methacrylate, ethyl methacrylate and 2-ethylhexyl acrylate.

The rubber-like polymer in the thus-obtained graft polymer (B) has a swell index of 10 to 80, preferably from 15 to 50, more preferably from 25 to 45. The swell index is a value measured and calculated as follows. That is, a latex is coagulated and dried, about 1 g of the polymer is then precisely weighed, immersed in about 50 g of toluene and left standing at 23° C. for 48 hours to swell the polymer, and thereafter extra toluene is removed by decantation. The swelled polymer is precisely weighed without delay and then dried under reduced pressure at 80° C. for 24 hours. After the absorbed toluene is removed by evaporation, the polymer is again precisely weighed, and the swell index is calculated according to the following formula.

Swell index={(weight of swelled polymer)−(weight of dried polymer)}/(weight of dried polymer)

If the swell index of the rubber-like polymer for use in the production of the graft polymer (B) is less than 10 or exceeds 80, the impact strength of the thermoplastic resin composition obtained is extremely low.

The weight average particle diameter of the rubber-like polymer in the graft polymer (B) is preferably from 100 to 600 nm, more preferably from 150 to 450 nm. It is preferred that a diene-based rubber latex particle comprising the rubber polymer having the above-described swell index and weight average particle diameter is obtained by various methods as described later and in the presence of this diene-based rubber latex particle as-is or after enlargement by aggregation, those aromatic vinyl-based monomer and vinyl cyanide-based monomer are graft-polymerized to obtain the graft polymer. For enlarging the diene-based rubber latex particle by aggregation, as is well known, the particles may be mechanically aggregated or an acidic substance may be added to the latex.

The acetone-soluble moiety in the graft polymer (B) has a number average molecular weight of 20,000 to 200,000. If the number average molecular weight of the acetone-soluble moiety in the graft polymer is less than 20,000, the thermoplastic resin composition obtained suffers from poor impact strength, whereas if it exceeds 200,000, the thermoplastic resin composition obtained exhibits poor fluidity. The number average molecular weight of the acetone-soluble moiety in the graft polymer is preferably from 20,000 to 100,000, more preferably from 20,000 to 60,000.

The method for producing such a graft polymer is not particularly limited and a conventionally known method may be used. For example, an emulsion polymerization method, a suspension polymerization method, a bulk polymerization method, a solution polymerization method or a combination thereof may be appropriately used.

In the thermoplastic resin composition, the graft polymer (B) is used in an amount of 20 to 79.5 parts by weight, preferably from 20 to 70 parts by weight, with the proviso that the total amount of the components (A) to (D) is 100 parts by weight. If the amount used is less than 20 parts by weight, the impact strength decreases, whereas if it exceeds 79.5 parts by weight, the fluidity decreases.

The unsaturated carboxylic acid-modified copolymer (C) is a copolymer obtained by copolymerizing from 0.05 to 20 wt %, preferably from 0.5 to 10 wt %, more preferably from 0.8 to 7 wt % of an unsaturated carboxylic acid monomer, from 89.95 to 50 wt %, preferably 89.5 to 55 wt %, more preferably from 84.2 to 60 wt % of an aromatic vinyl-based monomer, and from 10 to 49.95 wt %, preferably from 10 to 44.5 wt %, more preferably from 15 to 39.2 wt % of a vinyl cyanide-based monomer, and has a number average molecular weight of 22,000 to 60,000, preferably from 25,000 to 60,000.

Examples of the unsaturated carboxylic acid monomer constituting the unsaturated carboxylic acid-modified copolymer (C) include an acrylic acid, a methacrylic acid, a maleic acid, a fumaric acid and an itaconic acid. These monomers are used individually or as a mixture of two or more thereof. Among these, a methacrylic acid is preferred. As for the aromatic vinyl-based monomer and vinyl cyanide-based monomer, the same compounds as those used for the production of the graft polymer (B) can be used.

A part of the aromatic vinyl-based monomer constituting the unsaturated carboxylic acid-modified copolymer (C) can be replaced by another vinyl-based monomer copolymerizable with the aromatic vinyl-based monomer, for example, by an unsaturated carboxylic acid ester-based monomer such as methyl acrylate, ethyl acrylate, butyl acrylate, methyl methacrylate, ethyl methacrylate and 2-ethylhexyl acrylate.

The unsaturated carboxylic acid-modified copolymer must have a number average molecular weight of 22,000 to 60,000 so as to obtain a resin composition excellent in the balance between impact strength and fluidity. If the number average molecular weight of the unsaturated carboxylic acid-modified copolymer (C) is less than 22,000, the resin composition obtained is inferior in chemical resistance or paintability, whereas if it exceeds 60,000, the resin composition obtained exhibits poor fluidity. Here, the number average molecular weight of the unsaturated carboxylic acid-modified copolymer (C) is a molecular weight determined by dissolving the copolymer in tetrahydrofuran and measuring its molecular weight according to the GPC method (gel permeation chromatography method).

In the unsaturated carboxylic acid-modified copolymer (C), if the amount of the unsaturated carboxylic acid monomer is less than 0.05 wt %, this copolymer exhibits poor compatibility in the resin composition and the obtained resin composition is inferior in the impact strength and paintability, whereas if it exceeds 20 wt %, the fluidity of the obtained resin composition seriously decreases.

The unsaturated carboxylic acid-modified copolymer (C) is contained in an amount of 0.5 to 60 parts by weight, preferably from 1 to 35 parts by weight, with the proviso that the total of the components (A) to (D) in the thermoplastic resin composition is 100 parts by weight. If the amount of the unsaturated carboxylic acid-modified copolymer (C) is less than 0.5 parts by weight, this copolymer is not uniformly dispersed in the resin composition and the obtained resin composition is inferior in the impact strength and paintability, whereas if it exceeds 60 parts by weight, the obtained resin composition exhibits poor fluidity.

The unsaturated carboxylic acid-modified copolymer (C) having a number average molecular weight of 22,000 to 60,000 and containing from 0.05 to 20 wt % of an unsaturated carboxylic acid monomer is blended in the resin composition within an appropriate range, whereby excellent compatibility can be obtained between the polyamide resin and the styrene-based resin, and a thermoplastic resin composition excellent in the balance between impact strength and fluidity, particularly excellent in the impact strength at low temperatures, can be obtained.

The unsaturated carboxylic acid-modified copolymer (C) is also not particularly limited in its production method and can be obtained by appropriately using a conventionally known method such as emulsion polymerization method, bulk polymerization method, suspension polymerization method and solution polymerization method. As is well known, the number average molecular weight of such an unsaturated carboxylic acid-modified copolymer (C) can be freely adjusted by the polymerization temperature, the method of adding monomers used, the kind or the amount of the initiator, or that of the polymerization chain transfer agent such as tert-dodecylmercaptane.

The copolymer (D) is a copolymer obtained by copolymerizing from 90to 50 wt % of an aromatic vinyl-based monomer, from 10 to 50 wt % of a vinyl cyanide-based monomer and from 0 to 60 wt % of another vinyl monomer copolymerizable with those monomers. The copolymer (D) is preferably a copolymer obtained by copolymerizing from 90 to 55 wt % of an aromatic vinyl-based monomer, from 10 to 45 wt% of a vinyl cyanide-based monomer and from 0 to 10 wt % of another vinyl monomer copolymerizable with those monomers.

As for the aromatic vinyl-based monomer and vinyl cyanide-based monomer, the same compounds as those used for the production of the graft polymer (B) can be used. Examples of the another vinyl monomer copolymerizable with those monomers include maleimide-based monomers such as maleimide, methylmaleimide, ethylmaleimide, N-phenylmaleimide, N-cyclohexylmaleimide and O-chloro-N-phenylmaleimide, and unsaturated carboxylic acid ester-based monomers such as methyl acrylate, ethyl acrylate, methyl methacrylate, ethyl methacrylate and 2-ethylhexyl acrylate.

The weight average molecular weight of the copolymer (D) is not particularly limited but is usually from 50,000 to 250,000, preferably from 55,000 to 200,000. This copolymer (D) can be obtained by a conventionally known appropriate method such as an emulsion polymerization method, a bulk polymerization method, a suspension polymerization method and a solution polymerization method.

In the thermoplastic resin composition, the copolymer (D) is used in an amount of 0 to 50 parts by weight, preferably from 1 to 35 parts by weight, with the proviso that the total amount of the components (A) to (D) is 100part by weight. If the amount used exceeds 50 parts by weight, the impact strength decreases.

As described above, the thermoplastic resin composition comprises from 20 to 79.5 parts by weight of the polyamide resin (A), from 20 to 79.5 parts by weight of the graft polymer (B), from 0.5 to 60 parts by weight of the unsaturated carboxylic acid-modified copolymer (C) and from 0 to 50 parts by weight of the copolymer (D) (with the proviso that the total of the components (A) to (D) is 100 parts by weight). If any one component departs from this range, a thermoplastic resin composition having desired properties cannot be obtained.

Described in another way, the composition range is 100 parts by weight of the polyamide resin (A), from 30 to 300 parts by weight of the graft polymer (B), from 1 to 250 parts by weight of the unsaturated carboxylic acid-modified copolymer (C) and from 0 to 120 parts by weight of the copolymer (D), preferably 100 parts by weight of the polyamide resin (A), from 30 to 150 parts by weight of the graft polymer (B), from 1 to 120 parts by weight of the unsaturated carboxylic acid-modified copolymer (C) and from 0 to 120 parts by weight of the copolymer (D), more preferably 100 parts by weight of the polyamide resin (A), from 35 to 130 parts by weight of the graft polymer (B), from 2 to 110 parts by weight of the unsaturated carboxylic acid-modified copolymer (C) and from 0 to 100 parts by weight of the copolymer (D).

Furthermore, the content of the rubber-like polymer occupying in the entire resin composition is preferably from 8 to 40 wt %, more preferably from 10 to 25 wt %, in view of balance in physical properties of the thermoplastic resin composition obtained.

The inorganic filler (E) may include fibrous fillers such as glass fiber, carbon fiber, potassium titanate whisker, zinc oxide whisker, aluminum borate whisker, aramid fiber, alumina fiber, silicon carbide fiber, ceramic fiber, asbestos fiber, gypsum fiber and metal fiber, and non-fibrous fillers such as silicates (e.g., wollastonite, zeolite, sericite, kaolin, mica, clay, pyrophyllite, bentonite, montmorillonite, asbestos, talc, aluminosilicate), metal oxides (e.g., alumina, silicon oxide, magnesium oxide, zirconium oxide, titanium oxide, iron oxide), carbonates (e.g., calcium carbonate, magnesium carbonate, dolomite), sulfates (e.g., calcium sulfate, barium sulfate), hydroxides (e.g., magnesium hydroxide, calcium hydroxide, aluminum hydroxide), glass beads, ceramic beads, boron nitride, silicon carbide and silica. These inorganic fillers may have a hollow shape and may be used in combination of two or more thereof. From the standpoint of obtaining more excellent mechanical strength, such a filler is preferably used after preliminarily treating it with a coupling agent such as an isocyanate-based compound, an acryl-based compound, an organic silane-based compound, an organic titanate-based compound, an organic borane-based compound and an epoxy compound.

Among these inorganic fillers, the filler preferably used for enhancing the heat resistance is a fibrous filler such as carbon fiber and glass fiber.

The fibrous filler has a fiber diameter of 0.01 to 20 μm, preferably from 0.03 to 15 μm, and a fiber cut length of 0.5 to 10 mm, preferably from 0.7 to 6 mm.

The amount used of the inorganic filler (E), is from 0.05 to 150 parts by weight per 100 parts by weight of the thermoplastic resin comprising the components (A), (B), (C) and (D). If the amount used is less than 0.05 parts by weight, the effect of enhancing the mechanical strength and heat resistance is small, whereas if it exceeds 150 parts by weight, the shapability or surface state disadvantageously changes for the worse. In the case of using a fibrous filler as the inorganic filler (E), the amount used is preferably from 5 to 100 parts by weight.

A layered silicate may also be used as the inorganic filler (E). When a layered silicate is used, an effect of enhancing the mechanical strength and heat resistance can be obtained by the addition in a small amount and therefore, the fluidity or surface property is improved.

The amount used of the layered silicate is preferably from 0.05 to 30 parts by weight, more preferably from 0.1 to 10 parts by weight, per 100 parts by weight of the thermoplastic resin. If the proportion of the layered silicate is less than 0.05 parts by weight, the effect of enhancing the mechanical strength and heat resistance is small, whereas if it exceeds 30 parts by weight, the fluidity decreases extremely and poor shapability disadvantageously results.

Examples of the layered silicate include layered phyllosilicates constructed of layers of magnesium silicate or aluminum silicate.

Specific examples of the layered phyllosilicate include smectite clay minerals such as montmorillonite, saponite, beidellite, nontronite, hectorite and stevensite, as well as vermiculite and halloysite. These may be a natural product or a synthetic product. Among these layered silicates, montmorillonite is preferred.

The layered silicate may be dispersed in the entire thermoplastic resin comprising the components (A), (B), (C) and (D) or may be dispersed in at least one resin, but is preferably in a state of being uniformly dispersed in the resin.

The state that the layered silicate is uniformly dispersed is such a state that when a layered silicate having a one-side length of 0.002 to 1 μm and a thickness of 6 to 20 Å is dispersed in a resin, the layered silicate is uniformly dispersed while maintaining an interlayer distance of 20 Å or more on average. The interlayer distance as used herein means a distance between the gravitational centers of plates of the layered silicate, and the uniformly dispersed state means that multilayer materials each having a structure where the plates of the layered silicate are stacked in five layers or less on average are dispersed in parallel, at random or in a mixed form thereof and 50 wt % or more, preferably 70 wt % or more, of the multilayer materials are dispersed without locally forming a mass.

In the case where the layered silicate is a multilayer clay mineral, the layered silicate may also be uniformly dispersed by performing the polymerization after contacting the layered silicate with a swelling agent such as amine (e.g., dioctadecylamine, phenylenediamine), amino acid (e.g., 4-amino-n-butyric acid, 12-aminododecanoic acid) or lactams (e.g., ε-caprolactam) to previously expand the space between layers and thereby facilitate the intercalation of monomers between layers. Also, a method of previously expanding the space between layers to 20 Å or more by using a swelling agent and then melt-mixing the layered silicate with the resin, thereby uniformly dispersing the layered silicate, may be used.

As described above, the thermoplastic resin composition comprises 100 parts by weight of the thermoplastic resin comprising from 79.5 to 20 parts by weight, preferably from 70 to 20 parts by weight of the polyamide resin (A), from 20 to 79.5 parts by weight, preferably from 20 to 70 parts by weight of the graft polymer (B), from 0.5 to 60 parts by weight, preferably from 1 to 35 parts by weight of the unsaturated carboxylic acid-modified copolymer (C) and from 0 to 50 parts by weight, preferably from 1 to 35 parts by weight of the copolymer (D) (with the proviso that the total of (A), (B), (C) and (D) is 100 parts by weight), and from 0.05 to 150 parts by weight of the inorganic filler (E). If any one component departs from this range, a thermoplastic resin composition having desired properties cannot be obtained. Particularly, the content of the rubber-like polymer occupying in the entire resin composition is preferably from 8 to 40 wt % in view of balance in physical properties of the thermoplastic resin composition obtained.

The thermoplastic resin composition can be obtained by uniformly melt-mixing the above-described polyamide resin (A), graft polymer (B), unsaturated carboxylic acid-modified copolymer (C) and copolymer (D) and, if desired, further the inorganic filler (E), but the mixing order thereof is not particularly limited. For example, all components may be en bloc mixed at the same time, or after any two components are preliminarily mixed, remaining components may be added thereto and mixed. At the time of melt-mixing the mixture of respective components, an extrude, a Banbury mixer, a roll mill or the like may be used.

Also, if desired, other thermoplastic resins such as α-olefin or α-olefin copolymer (e.g., polyethylene, polypropylene), styrene-based resin (e.g., polystyrene, high-impact styrene), polycarbonate, polybutylene terephthalate, polyethylene terephthalate, polymethyl methacrylate, polyphenylene ether, polyphenylene sulfide, polysulfone, polyethersulfone, polyimide, polyetherimide and polyether ether ketone may be added to the above-described components. Furthermore, various additives such as an antioxidant, an ultraviolet absorbent, a light stabilizer, an antistatic agent, a lubricant, a dye, a pigment, a plasticizer, a flame retardant and a release agent may be added.

A shaped article is obtained by shaping the thermoplastic resin composition described above. As for the shaping method, a commonly employed shaping method such as injection molding, extrusion molding, blow molding, vacuum molding and press molding can be used. In particular, injection molding and extrusion molding are preferred. The thus-obtained shaped article may be subjected to a secondary processing such as coating, vapor deposition and adhesion.

The shaped article is excellent in the impact strength, heat resistance, chemical resistance and paintability and can be used for electric-electronic parts, machine parts and automobile parts such as automobile functional parts, automobile interior parts and automobile exterior parts. In particular, the shaped article is suitably used for automobile parts.

Examples of the automobile interior parts include register blade, washer lever, window regulator handle, knob of window regulator handle, passing light lever, sun visor bracket, shift knob, door trim, armrest, instrument panel, console box, steering wheel, rearview mirror housing, door inner panel, air duct panel, window molding fastener, speed cable liner, belt lock striker and headrest rod holder.

Examples of the automobile exterior parts include two-wheeled automobile parts such as front cowl, rear cowl and side cover, and four-wheeled automobile parts such as bumper, bumper corner, bumper skirt radiator grille, fog lamp reflector, hood, fender, door panel, side-view mirror housing, center pillar, air outlet louver, wheel, wheel cap, emblem, exterior trim and molding, sliding roof and tail lamp rim.

EXAMPLES

Our resins and compositions are described below by referring to Examples, but they are not limited thereto. In Examples, the "parts" and "%" are on a weight basis.

[Thermoplastic Resin Composition (1)]

Reference Example 1

(Production of Rubber-Like Polymer)

100 Parts of 1,3-butadiene, 0.3 parts of tert-dodecylmercaptane, 0.25 parts of potassium persulfate, 2.5 parts of potassium oleate, 0.1 part of potassium hydroxide and 170 parts of pure water were charged into a pressure vessel and after elevating the temperature to 65° C., the polymerization was initiated. The diene-based rubber latex (b-(1)) obtained after the completion of polymerization for 20 hours had a solid content of 37%, a weight average particle diameter of 65 nm and a swell index of 20. The diene-based rubber latex (b-(2)) obtained after the completion of polymerization for 12 hours had a solid content of 25%, a weight average particle diameter of 50 nm and a swell index of 40. The swell index of the rubber-like polymer was determined as described before.

(Enlargement by Aggregation of Lubber-Like Polymer)

The diene-based rubber latex (b-(1)) prepared above was mechanically aggregated to obtain an enlarged diene-based rubber latex (b-1) containing a rubber-like polymer having a swell index of 36 and a weight average molecular weight of 300 nm. Separately, 0.1 part of acetic acid was added to 100 parts by weight of the diene-based rubber latex (b-(2)) prepared above and after mixing with stirring for 10 minutes, 10 parts of an aqueous 10% potassium hydroxide solution was added to obtain an enlarged diene-based rubber latex (b-2)

having a solid content of 34%, a swell index of 41 and a weight average particle diameter of 300 nm.

(Production of Graft Polymer B)

65 Parts (as solid content) of the enlarged diene-based rubber latex (b-1) prepared above, 1.5 parts of sodium dodecylbenzenesulfonate and 0.3 parts of potassium persulfate were charged into a stainless steel vessel and after elevating the temperature to 65° C., a monomer mixture comprising 24.5 parts of styrene and 10.5 parts of acrylonitrile was continuously added over 5 hours to obtain a graft polymer latex. Thereto, 1 part of a phenol-based antioxidant and 2 parts of a phosphite-based antioxidant were added per 100 parts by weight (as solid content) of the graft polymer latex, and the resulting mixture was coagulated, by using magnesium sulfate, dehydrated and dried to obtain Graft Polymer B-1. In this Graft Polymer B-1, the swell index of the rubber-like polymer was 36, the weight average particle diameter thereof was 320 nm, the rubber-like polymer content was 65%, and the number average molecular weight of the acetone-soluble moiety was 22,000.

Also, Graft Polymer B-2 was obtained in the same manner as Graft Polymer B-1 except that 50 parts (as solid content) of the enlarged diene-based rubber latex (b-2) was added with ferrous sulfate as the reducing agent in a redox catalyst system using cumene hydroperoxide as the initiator, the polymerization temperature was set to 50° C., and the entire amount of the monomer mixture comprising 38.5 parts of styrene and 11.5 parts of acrylonitrile was added at the initial stage. In this Graft Polymer B-2, the swell index of the rubber-like polymer was 41, the weight average particle diameter thereof was 290 nm, the rubber-like polymer content was 50%, and the number average molecular weight of the acetone-soluble moiety was 49,000.

Production of Graft Polymer B-3

Graft Polymer B-3 was obtained in the same manner as Graft Polymer B-1 except for reacting 40 parts of styrene and 15 parts of acrylonitrile in the presence of 45 parts (as a solid content) of polybutyl acrylate. In this Graft Polymer B-3, the swell index of the rubber-like polymer was 43, the weight average particle diameter thereof was 170 nm, the rubber-like polymer content was 45%, and the number average molecular weight of the acetone-soluble moiety was 50,000.

Production of Graft Polymer B-4

Graft Copolymer B-4 was obtained in the same manner as Graft Polymer B-1 except for reacting 21 parts of styrene and 9 parts of acrylonitrile in the presence of 70 parts (as a solid content) of ethylene-propylene-non-conjugated diene copolymer rubber latex (ethylene propylene: non-conjugated diene (5-ethylene-2-norbornene)). In this Graft Polymer B-4, the swell index of the rubber-like polymer was 24, the weight average particle diameter thereof was 470 nm, the rubber-like polymer content was 70%, and the number average molecular weight of the acetone-soluble moiety was 24,000.

(Production of Unsaturated Carboxylic Acid-Modified Copolymer C)

200 Parts of pure water, 0.3 parts of potassium persulfate and 2 parts of sodium dodecylbenzenesulfonate were charged into a stainless steel vessel and after elevating the temperature to 65° C. with stirring, a monomer mixture comprising 74 parts of styrene, 25 parts of acrylonitrile, 1 part of methacrylic acid and 0.5 parts of tert-dodecylmercaptane was continuously added over 5 hours. Subsequently, the temperature of the reaction system was elevated to 70° C. and at this temperature, the reaction product was ripened for 1 hour, thereby completing the polymerization. Thereafter, the resulting polymer was salted out by using calcium chloride, dehydrated and dried to obtain Unsaturated Carboxylic Acid-Modified Copolymer C-1. The number average molecular weight of the obtained Unsaturated Carboxylic Acid-Modified, that is, Methacrylic Acid-Modified Copolymer C-1 was 50,000.

Methacrylic Acid-Modified Copolymer C-2 was obtained in the same manner as in the production of Methacrylic Acid-Modified Copolymer C-1 except for using a monomer mixture comprising 73 parts of styrene, 24 parts of acrylonitrile, 3 parts of methacrylic acid and 0.5 parts of tert-dodecylmercaptane as the monomer mixture. The number average molecular weight of Methacrylic Acid-Modified Copolymer C-2 obtained was 44,000.

Methacrylic Acid-Modified Copolymer C-3 was obtained in the same manner as in the production of Methacrylic Acid-Modified Copolymer C-2 except for using a monomer mixture comprising 73 parts of styrene, 24 parts of acrylonitrile, 3 parts of methacrylic acid and 1 part of tert-dodecylmercaptane as the monomer mixture. The number average molecular weight of Methacrylic Acid-Modified Copolymer C-3 obtained was 26,000.

Methacrylic Acid-Modified Copolymer C-4 was obtained in the same manner as in the production of Methacrylic Acid-Modified Copolymer C-1 except for using a monomer mixture comprising 72 parts of styrene, 23 parts of acrylonitrile, 5 parts of methacrylic acid and 0.5 parts of tert-dodecylmercaptane as the monomer mixture. The number average molecular weight of Methacrylic Acid-Modified Copolymer C-4 obtained was 46,000.

Furthermore, Methacrylic Acid-Modified Copolymer C-5 was obtained in the same manner as in the production of Methacrylic Acid-Modified Copolymer C-2 except for using a monomer mixture comprising 73 parts of styrene, 24 parts of acrylonitrile, 3 parts of methacrylic acid and 1.6 parts of tert-dodecylmercaptane as the monomer mixture. The number average molecular weight of Methacrylic Acid-Modified Copolymer C-5 obtained was 20,000.

(Production of Copolymer D)

200 Parts of pure water and 0.3 parts of potassium persulfate were charged into a pressure vessel and, after elevating the temperature to 65° C. with stirring, a monomer mixture comprising 70 parts of styrene, 30 parts of acrylonitrile and 0.3 parts of tert-dodecylmercaptane, and 30 parts of an aqueous emulsifier solution containing 2 parts of sodium dodecylbenzenesulfonate were each continuously added over 5 hours. Subsequently, the temperature of the reaction system was elevated to 70° C. and at this temperature, the reaction product was ripened for 3 hours, thereby completing the polymerization. Thereafter, the resulting polymer was salted out by using calcium chloride, dehydrated and dried to obtain Copolymer D-1. The number average molecular weight of the obtained Copolymer D-1 was 89,000.

Also, Copolymer D-2 was obtained in the same manner as in the production of Copolymer D-1 except for using 1.2 parts of tert-dodecylmercaptane. The number average molecular weight of the obtained Copolymer D-2 was 60,000.

Examples 1 to 15 and Comparative Examples 1 and 2

Polyamide Resin A-2 (nylon 6 (1013B, number average molecular weight: 13,000), produced by Ube Industries, Ltd.), Polyamide Resin A-4 (nylon 6 (1022B, number average molecular weight: 22,000), produced by Ube Industries, Ltd.), graft copolymer B, unsaturated carboxylic acid-modified copolymer C and copolymer D were mixed at a ratio shown in Table 1, melt-mixed at 250° C. by using a 30-mm twin-screw extruder, pelletized and then shaped by injection molding to prepare thermoplastic resin compositions as specimens, and their physical properties were evaluated. The results are shown in Table 1. In the Table, the numerical value in the parenthesis of each component of the resin composition is the number of parts by weight of each component, with the proviso that the polyamide resin is 100 parts by weight.

(Impact strength)

The impact strength was evaluated according to ASTM D-256 under the conditions of ⅛ inch and 23° C.

(Fluidity)

The melt viscosity (Pa·s) as an index for fluidity was measured at a temperature of 260° C. and a shear rate of 1,000 sec$^{-1}$ by using a capillograph (Capillograph 1C, manufactured by Toyo Seiki Seisaku-Sho, Ltd.).

(Heat Resistance)

The heat resistance was evaluated according to ASTM D-648 under the conditions of ¼ inch and a load of 1.82 MPa.

(Flexural Modulus)

The flexural modulus was evaluated according to ASTM D-790.

(Chemical Resistance)

A strip-like specimen (150×10×2 mm) produced by injection molding was fixed along a testing jig for the Bending Form Method, and a liquid chemical (2-ethylhexyl phthalate) was coated on the specimen. After allowing the specimen to stand for 48 hours in an environment at 23° C., the change in the outer appearance was observed with an eye. The chemical resistance was rated AA (good) when the outer appearance was not changed, and rated BB (moderate) when slightly changed.

(Paintability)

The paintability was evaluated according to JISK-5400. That is, a two-liquid type urethane-based paint (Urethane PG60, produced by Kansai Paint Co., Ltd.) was spray-coated on the surface of a plate-like specimen (160 mm×60 mm, thickness: 2.5 mm) in an environment at room temperature and relative humidity of 80% and after the passing of 120 hours, the coating film was subjected to an adhesion test. The paintability was rated AA (good) when 1-mm squares (100 squares, n=2) were not separated, and rated CC (not good) when they separated.

(Particle Diameter of Rubber-Like Polymer)

The weight average particle diameter was measured by a Spectronic 21D (manufactured by Milton Roy) at a wavelength of 546 nm.

In Table 1, A-2 is a polyamide resin (nylon 6 (1013B), produced by Ube Industries, Ltd.); A-4 is a polyamide resin (nylon 6 (1022B), produced by Ube Industries, Ltd.); B-1 is a graft polymer containing 65% of a rubber-like polymer having a swell index of 36 and a weight average particle diameter of 320 nm, in which the styrene/acrylonitrile ratio was 70/30 by weight and the number average molecular weight of the acetone-soluble moiety was 22,000; B-2 is a graft polymer containing 50% of a rubber-like polymer having a swell index of 41 and a weight average particle diameter of 290 nm, in which the styrene/acrylonitrile ratio was 77/23 by weight and the number average molecular weight of the acetone-soluble moiety was 49,000; B-3 is a graft polymer containing 45% of a rubber-like polymer having a swell index of 43 and a weight average particle diameter of 170 nm, in which the styrene/acrylonitrile ratio was 73/27 by weight and the number average molecular weight of the acetone-soluble moiety was 50,000; B-4 is a graft polymer containing 70% of a rubber-like polymer having a swell index of 24 and a weight average particle diameter of 470 nm, in which the styrene/acrylonitrile ratio was 70/30 by weight and the number average molecular weight of the acetone-soluble moiety was 24,000; C-1 is a methacrylic acid-modified copolymer having a methacrylic acid content of 1.0% and a number average molecular weight of 50,000; C-2 is a methacrylic acid-modified copolymer having a methacrylic acid content of 3.0% and a number average molecular weight of 44,000; C-3 is a methacrylic acid-modified copolymer having a methacrylic acid content of 3.0% and a number average molecular weight of 26,000; C-4 is a methacrylic acid-modified copolymer having a methacrylic acid content of 5.0% and a number average molecular weight of 46,000; C-5 is a methacrylic acid-modified copolymer having a methacrylic acid content of 3.0% and a number average molecular weight of 20,000; D-1 is a copolymer having an acrylonitrile/styrene ratio of 32/68 by weight and a weight average molecular weight of 89,000; and D-2 is a copolymer having an acrylonitrile/styrene ratio of 24/76 by weight and a weight average molecular weight of 60,000.

The thermoplastic resin composition of Comparative Example 1 which did not contain an unsaturated carboxylic acid-modified copolymer was inferior in the impact strength, fluidity, paintability and the like. On the other hand, the thermoplastic resin compositions of Examples 1 to 15 all were excellent not only in the impact strength but also in the balance between impact strength and fluidity. Also, as is apparent from comparison with the thermoplastic resin compositions of Examples 1 and 2, the thermoplastic resin composition of Comparative Example 2 where the unsaturated carboxylic acid-modified copolymer used had a number average molecular weight of 20,000 was inferior in the chemical resistance and paintability.

TABLE 1

|  | Example 1 | Example 2 | Example 3 | Example 4 | Example 5 | Example 6 | Example 7 | Example 8 | Example 9 |
|---|---|---|---|---|---|---|---|---|---|
| A-2 |  |  |  |  |  |  |  |  |  |
| A-4 | 30(100) | 30(100) | 30(100) | 30(100) | 30(100) | 60(100) | 60(100) | 60(100) | 60(100) |
| B-1 |  | 29(97) |  |  |  |  |  |  |  |
| B-2 | 38(127) |  | 38(127) | 38(127) | 38(127) | 25(42) | 25(42) | 25(42) | 25(42) |
| B-3 |  |  |  |  |  |  |  |  |  |
| B-4 |  |  |  |  |  |  |  |  |  |
| C-1 |  |  | 32(107) |  |  | 10(17) |  |  |  |
| C-2 | 12(40) | 12(40) |  |  | 24(80) |  |  |  |  |
| C-3 |  |  |  |  |  |  |  |  |  |
| C-4 |  |  |  | 12(40) |  |  | 2(3) | 5(8) | 10(17) |
| C-5 |  |  |  |  |  |  |  |  |  |

TABLE 1-continued

|  |  | Example 10 | Example 11 | Example 12 | Example 13 | Example 14 | Example 15 | Comparative Example 1 | Comparative Example 2 |
|---|---|---|---|---|---|---|---|---|---|
| D-1 |  | 20(67) | 29(97) |  | 20(67) | 8(27) |  |  |  |
| D-2 |  |  |  |  |  |  | 5(8) | 13(22) | 10(17) | 5(8) |
| R.C. [%] |  | 19.0 | 19.0 | 19.0 | 19.0 | 19.0 | 12.5 | 12.5 | 12.5 | 12.5 |
| Izod impact ⅛" RT | [J/m] | 876 | 824 | 820 | 780 | 850 | 100 | 153 | 1084 | 1137 |
| strength ⅛" −30° C. | [J/m] | 341 | 485 | 97 | 250 | 300 | 46 | 45 | 54 | 118 |
| Fluidity | 1000 sec$^{-1}$ | 354 | 289 | 323 | 388 | 398 | 194 | 187 | 218 | 272 |
| Flexural modulus | [MPa] | 1,750 | 1,850 | 1,600 | 1,800 | 2,000 | 1,700 | 1,750 | 1,800 | 1,800 |
| Heat resistance | [° C.] | 88 | 90 | 88 | 86 | 87 | 78 | 72 | 74 | 77 |
| Chemical resistance |  | AA | AA | AA | AA | AA | AA | AA | AA | AA |
| Paintability |  | AA | AA | AA | AA | AA | AA | AA | AA | AA |

|  |  | Example 10 | Example 11 | Example 12 | Example 13 | Example 14 | Example 15 | Comparative Example 1 | Comparative Example 2 |
|---|---|---|---|---|---|---|---|---|---|
| A-2 |  |  |  | 30(100) | 60(100) | 30(100) | 60(100) |  |  |
| A-4 |  | 60(100) | 30(100) |  |  |  |  | 40(100) | 30(100) |
| B-1 |  |  |  |  |  |  |  |  |  |
| B-2 |  | 25(42) | 38(127) |  |  |  |  | 35(88) | 38(127) |
| B-3 |  |  |  | 42(140) | 33(55) |  |  |  |  |
| B-4 |  |  |  |  |  | 27(90) | 21(35) |  |  |
| C-1 |  |  |  |  |  |  |  |  |  |
| C-2 |  | 15(25) |  |  |  |  |  |  |  |
| C-3 |  |  | 12(40) |  |  |  |  |  |  |
| C-4 |  |  |  | 5(17) | 5(8) | 5(17) | 5(8) |  |  |
| C-5 |  |  |  |  |  |  |  |  | 12(40) |
| D-1 |  |  | 20(67) | 23(77) | 2(3) | 38(127) | 14(23) | 25(63) | 20(67) |
| D-2 |  |  |  |  |  |  |  |  |  |
| R.C. [%] |  | 12.5 | 19.0 | 19.0 | 15.0 | 19.0 | 15.0 | 17.5 | 19.0 |
| Izod impact ⅛" RT | [J/m] | 850 | 660 | 152 | 149 | 140 | 135 | 90 | 459 |
| strength ⅛" −30° C. | [J/m] | 93 | 97 | 65 | 40 | 61 | 37 | 35 | 67 |
| Fluidity | 1000 sec$^{-1}$ | 398 | 303 | 238 | 232 | 255 | 229 | 100 | 285 |
| Flexural modulus | [MPa] | 2,200 | 1,700 | 2,215 | 2,068 | 2,219 | 2,090 | 2,000 | 1,700 |
| Heat resistance | [° C.] | 68 | 90 | 90 | 76 | 93 | 79 | 79 | 91 |
| Chemical resistance |  | AA | AA | AA | AA | AA | AA | BB | BB |
| Paintability |  | AA | AA | AA | AA | AA | AA | CC | CC |

[Thermoplastic Resin Composition (2)]

The physical properties of the shaped articles in Examples 16 to 28 below were measured as follows.

(Fluidity)

The melt flow rate (MFR) was measured according to ASTM D-1238 under the conditions of 250° C. and a load of 5 kgf. The unit is g/10 min.

(Flexural Modulus)

The flexural modulus was measured according to ASTM D-790. Shape: thickness=⅛ inch.

(Impact strength)

The Izod impact strength was measured according to ASTM D-256. Thickness=¼ inch, temperature=23° C.

(Heat Resistance)

The thermal deformation temperature was measured according to ASTM D-648 under the conditions of a thickness of ¼ inch and a load of 4.6 MPa or 18.2 MPa.

[Resins and the Like Used]

(A) Polyamide Resin

A-1: Polyamide 6 (1011FB, produced by Ube Industries, Ltd., number average molecular weight: 11,000)

A-2: Polyamide 6 (1013B, produced by Ube Industries, Ltd., number average molecular weight: 13,000)

A-3: Polyamide 6 (1015SB, produced by Ube Industries, Ltd., number average molecular weight: 15,000)

A-5: Polyamide 6 (1015C2, produced by Ube Industries, Ltd., number average molecular weight: 15,000, containing 2.0 parts by weight of montmorillonite per 100 parts by weight of the polyamide resin)

Polyamide Resin A-5 was produced as follows. The spaces between layers of montmorillonite as a layered silicate with one unit having a thickness of 9.5 Å on average and an average one-side length of about 0.1 μm were previously expanded by using 12-aminododecanoic acid as the swelling agent to facilitate the intercalation of monomers between layers, and then ε-caprolactam was polymerized, whereby the montmorillonite was uniformly dispersed in the polyamide. Incidentally, when this material was measured by X-ray diffraction, the interlayer distance was 100 Å or more.

(B) Graft Polymer

B-1: a graft polymer containing 65% of a rubber-like polymer having a swell index of 36 and a weight average particle diameter of 320 nm, in which the styrene/acrylonitrile ratio was 70/30 by weight and the number average molecular weight of the acetone-soluble portion was 22,000

(C) Methacrylic Acid-Modified Copolymer

C-4: a methacrylic acid-modified copolymer having a methacrylic acid content of 5.0% and a number average molecular weight of 46,000

(D) Copolymer

D-2: a copolymer having an acrylonitrile/styrene ratio of 24/76 by weight and a weight average molecular weight of 60,000

(E) Inorganic Filler

E-1: Carbon fiber (fiber length: 6 mm, fiber diameter: 7 μm)
E-2: Glass fiber (fiber length: 3 mm, fiber diameter: 10 μm)
E-3: Montmorillonite (thickness: 9.5 Å, one-side length: 0.1 μM)

The graft polymer (B-1), methacrylic acid-modified copolymer (C-4) and copolymer (D-1) were produced in the same manner as in Reference Example 1.

Examples 16 to 28

The polyamide resin A, graft copolymer B, unsaturated carboxylic acid-modified copolymer C, copolymer D and inorganic filler E were mixed at ratios shown in Table 2, melt-mixed at 250° C. by using a 30-mm twin-screw extruder, pelletized and then shaped by injection molding to prepare thermoplastic resin compositions as specimens, and their physical properties were evaluated. The results are shown in Table 2.

TABLE 2

| | | Example | | | | | | | | | | | | |
|---|---|---|---|---|---|---|---|---|---|---|---|---|---|---|
| | | 16 | 17 | 18 | 19 | 20 | 21 | 22 | 23 | 24 | 25 | 26 | 27 | 28 |
| Resin Composition | | | | | | | | | | | | | | |
| A-1 | wt % | 55 | | | 55 | 55 | 55 | | 55 | 55 | 55 | 55 | 55 | |
| A-2 | wt % | | 55 | | | | | | | | | | | |
| A-3 | wt % | | | 55 | | | | | | | | | | 55 |
| A-5* | wt % | | | | | | | (55) | | | | | | |
| B-1 | wt % | 25 | 25 | 25 | 23 | 23 | 25 | 25 | 23 | 21 | 21 | 21 | 25 | 25 |
| C-4 | wt % | 4 | 4 | 4 | 4 | 4 | 4 | 4 | 4 | 4 | 6 | 2 | 4 | 4 |
| D-2 | wt % | 16 | 16 | 16 | 18 | 18 | 16 | 16 | 18 | 20 | 18 | 22 | 16 | 16 |
| E-1 | wt % | 5 | 5 | 5 | | | | | 5 | 5 | 5 | 5 | | |
| E-2 | wt % | | | | 10 | 20 | 20 | | | | | | | |
| E-3 | wt % | | | | | | | (1.1) | | | | | | |
| Physical Properties of Material | | | | | | | | | | | | | | |
| MFR | g/10 min | 35 | 25 | 15 | 34 | 30 | 26 | 31 | 41 | 45 | 37 | 60 | 74 | 36 |
| Flexural modulus | GPa | 4.3 | 4.3 | 4.3 | 3.5 | 5.0 | 5.2 | 2.7 | 4.3 | 4.5 | 4.5 | 4.6 | 2.2 | 2.3 |
| Izod impact strength | J/m | 84 | 82 | 80 | 78 | 108 | 113 | 62 | 67 | 61 | 68 | 55 | 112 | 106 |
| Heat distortion temperature (4.6 MPa) | ° C. | 207 | | | | | | 140 | | | | | | |
| Heat distortion temperature (18.2 MPa) | ° C. | 127 | 124 | 125 | 123 | 171 | 164 | 93 | 127 | 143 | 136 | 150 | 83 | 81 |

*As for Polyamide A-5, the proportions of resin component and montmorillonite (E-3) are separately shown.

INDUSTRIAL APPLICABILITY

As described in the foregoing pages, the thermoplastic resin composition comprises a polyamide resin, a rubber-reinforced styrene-based resin, an unsaturated carboxylic acid-modified copolymer as a compatibilizing agent and, if desired, an aromatic vinyl-based monomer-vinyl cyanide-based monomer copolymer and, if desired, further comprises an inorganic filler, and by using, particularly, a polyamide resin having a number average molecular weight within the specified range, a rubber-reinforced styrene-based resin with the acetone-soluble moiety having a number average molecular weight within the specified range, and an unsaturated carboxylic acid-modified copolymer having a number average molecular weight within a predetermined range, the thermoplastic resin composition can be excellent in the balance between impact strength and fluidity and also excellent in the heat resistance, chemical resistance and paintability.

Accordingly, the shaped article comprising the thermoplastic resin composition can be used for electric and electronic parts, machine parts, automobile parts such as automobile functional parts, automobile interior parts and automobile exterior parts. In particular, the shaped article can be suitably used for automobile parts.

The invention claimed is:

1. A thermoplastic resin composition comprising the following components:
   (A) from 20 to 79.5 parts by weight of a polyamide resin;
   (B) from 20 to 79.5 parts by weight of a graft polymer, said graft polymer being obtained by,
      (a) in the presence of from 40 to 80 wt % of a rubber-like polymer having a swell index of 10 to 80 and a weight average particle diameter of 100 to 600 nm,
      (b) graft-polymerizing from 20 to 60 wt % of a monomer mixture comprising:
         (i) from 50 to 90 wt % of an aromatic vinyl-based monomer,
         (ii) from 10 to 50 wt % of a vinyl cyanide-based monomer, and
         (iii) from 0 to 30 wt % of another vinyl monomer copolymerizable with those monomers,
      in which the acetone-soluble moiety of the graft polymer has a number average molecular weight of 20,000 to 100,000;
   (C) from 0.5 to 60 parts by weight of an unsaturated carboxylic acid-modified polymer,
   said unsaturated carboxylic acid-modified polymer being obtained by copolymerizing from 0.05 to 20 wt % of an unsaturated carboxylic acid monomer, from 50 to 89.95 wt % of an aromatic vinyl-based monomer and from 10 to 49.95 wt % of a vinyl cyanide-based monomer, and having a number average molecular weight of 25,000 to 60,000; and
   (D) from 0 to 50 parts by weight of a copolymer,
   said copolymer being obtained by copolymerizing from 50 to 90 wt % of an aromatic vinyl monomer, from 10 to 50 wt % of a vinyl cyanide-based monomer and from 0 to 60 wt % of a maleimide-based monomer and/or unsaturated carboxylic acid ester-based monomer;
   with the proviso that the total amount of the components (A) to (D) is 100 parts by weight.

2. The thermoplastic resin composition as claimed in claim 1, wherein the graft polymer is obtained by graft-polymerizing styrene and acrylonitrile in the presence of a rubber polymer.

3. The thermoplastic resin composition as claimed in claim 1, wherein the amount of unsaturated carboxylic acid monomer in the unsaturated carboxylic acid-modified copolymer is from 0.5 to 10 wt %.

4. The thermoplastic resin composition as claimed in claim 1, wherein the amount of the unsaturated carboxylic acid monomer in the unsaturated carboxylic acid-modified copolymer is from 0.8 to 7 wt %.

5. The thermoplastic resin composition as claimed in claim 1, wherein unsaturated carboxylic acid in the unsaturated carboxylic acid-modified copolymer is methacrylic acid.

6. The thermoplastic resin composition as claimed in claim 1, wherein the unsaturated carboxylic acid-modifed copolymer is obtained by copolymerizing methacrylic acid, styrene and acrylonitrile.

7. A shaped article comprising the thermoplastic resin composition claimed in claim 1.

8. An automobile part obtained by shaping the thermoplastic resin composition claimed in claim 1.

9. The thermoplastic resin composition as claimed in claim 1, wherein the number average molecular weight of the unsaturated carboxylic acid-modified copolymer is 26,000 to 60,000.

10. A thermoplastic resin composition comprising the following components:
(A) from 20 to 79.5 parts by weight of a polyamide resin;
(B) from 20 to 79.5 parts by weight of a graft polymer,
said graft polymer being obtained by,
 (a) in the presence of from 40 to 80 wt % of a rubber polymer having a swell index of 10 to 80 and a weight average particle diameter of 100 to 600 nm,
 (b) graft-polymerizing from 20 to 60 wt % of a monomer mixture comprising:
  (i) from 50 to 90 wt % of an aromatic vinyl-based monomer,
  (ii) from 10 to 50 wt % of a vinyl cyanide-based monomer, and
  (iii) from 0 to 30 wt % of another vinyl monomer copolymerizable with those monomers,
 in which the acetone-soluble moiety of the graft polymer has a number average molecular weight of 20,000 to 100,000;
(C) from 0.5 to 60 parts by weight of an unsaturated carboxylic acid-modified polymer,
said unsaturated carboxylic acid-modified polymer being obtained by copolymerizing from 0.05 to 20 wt % of an unsaturated carboxylic acid monomer, from 50 to 89.95 wt % of an aromatic vinyl-based monomer and from 10 to 49.95 wt % of a vinyl cyanide-based monomer, and having a number average molecular weight of 25,000 to 60,000;
(D) from 0 to 50 parts by weight of a copolymer,
said copolymer being obtained by copolymerizing from 50 to 90 wt % of an aromatic vinyl monomer, from 10 to 50 wt % of a vinyl cyanide-based monomer and from 0 to 60 wt % of a maleimide-based monomer and/or unsaturated carboxylic and ester-based monomer;
with the proviso that the total amount of the components (A) to (D) is 100 parts by weight; and
(E) from 0.05 to 150 parts by weight of an inorganic filler.

11. The thermoplastic resin composition as claimed in claim 10, wherein the number average molecular weight of the polyamide resin is from 10,000 to 20,000.

12. The thermoplastic resin composition as claimed in claim 10, wherein the inorganic filler is a layered silicate with one unit having a one-side length of 0.002 to 1 μm and a thickness of 6 to 20 A.

13. The thermoplastic resin composition as claimed in claim 10, wherein the graft polymer is obtained by graft-polymerizing styrene and acrylonitrile in the presence of a rubber polymer.

14. The thermoplastic resin composition as claimed in claim 10, wherein the amount of the unsaturated carboxylic acid monomer in the unsaturated carboxylic acid-modified copolymer is from 0.5 to 10 wt %.

15. The thermoplastic resin composition as claimed in claim 10, wherein the amount of the unsaturated carboxylic acid monomer in the unsaturated carboxylic acid-modified copolymer is from 0.8 to 7 wt %.

16. The thermoplastic resin composition as claimed in claim 10, wherein the unsaturated carboxylic acid in the unsaturated carboxylic acid-modified copolymer is methacrylic acid.

17. The thermoplastic resin composition as claimed in claim 10, wherein the unsaturated carboxylic acid-modified copolymer is obtained by copolymerizing methacrylic acid, styrene and acrylonitrile.

18. A shaped article comprising the thermoplastic resin composition claimed in claim 10.

19. An automobile part obtained by shaping the thermoplastic resin composition claimed in claim 10.

20. The thermoplastic resin composition as claimed in claim 10, wherein the number average molecular weight of the unsaturated carboxylic acid-modified copolymer is 26,000 to 60,000.

* * * * *

UNITED STATES PATENT AND TRADEMARK OFFICE
CERTIFICATE OF CORRECTION

| | |
|---|---|
| PATENT NO. | : 7,589,142 B2 |
| APPLICATION NO. | : 10/527604 |
| DATED | : September 15, 2009 |
| INVENTOR(S) | : Maeda et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 448 days.

Signed and Sealed this

Twenty-first Day of September, 2010

David J. Kappos
*Director of the United States Patent and Trademark Office*